US010552872B2

(12) United States Patent
Jones et al.

(10) Patent No.: US 10,552,872 B2
(45) Date of Patent: Feb. 4, 2020

(54) SYSTEMS, APPARATUSES, AND METHOD FOR MAPPING A SPACE

(71) Applicant: Walmart Apollo, LLC, Bentonville, AR (US)

(72) Inventors: Nicholaus A. Jones, Fayetteville, AR (US); Matthew A. Jones, Bentonville, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 164 days.

(21) Appl. No.: 15/491,394

(22) Filed: Apr. 19, 2017

(65) Prior Publication Data

US 2017/0300973 A1 Oct. 19, 2017

Related U.S. Application Data

(60) Provisional application No. 62/324,563, filed on Apr. 19, 2016.

(51) Int. Cl.
*G06Q 30/02* (2012.01)
*H04W 4/029* (2018.01)
*G01C 5/00* (2006.01)
*G01S 19/42* (2010.01)

(52) U.S. Cl.
CPC ........... *G06Q 30/0261* (2013.01); *G01C 5/00* (2013.01); *G01S 19/42* (2013.01); *G06Q 30/0269* (2013.01); *H04W 4/029* (2018.02)

(58) Field of Classification Search
CPC .......... G06Q 30/0261; G06Q 30/0269; H04W 4/029; G01C 5/00; G01C 21/005; G01C 21/206; G01S 5/02; G01S 19/42; G01S 19/49
See application file for complete search history.

(56) References Cited

U.S. PATENT DOCUMENTS 7,801,114 B1 9/2010 Croak
8,965,460 B1 2/2015 Rao
9,129,249 B2 9/2015 Hu
(Continued)

OTHER PUBLICATIONS

PCT; App. No. PCT/US2017/028052; International Search Report and Written Opinion dated Jun. 27, 2017.

*Primary Examiner* — Thomas E Worden
(74) *Attorney, Agent, or Firm* — Fitch, Even, Tabin & Flannery LLP

(57) ABSTRACT

In some embodiments, apparatuses and methods are provided herein useful to mapping a space. In some embodiments, a system for mapping a space comprises a communication device configured to receive location data from a portable user device in a user space, a device location database configured to store location data, and a control circuit. The control circuit being configured to aggregate, over time, the location data in the user space from the portable user device and store the location data in the device location database, the location data comprising coordinates and timestamps associated with a plurality of locations, determine a plurality of dwell locations in the user space corresponding to locations where the portable user device rests based on the timestamps of the location data, and identify one or more objects in the user space based at least on the coordinates of the plurality of dwell locations.

17 Claims, 5 Drawing Sheets

(56) References Cited

U.S. PATENT DOCUMENTS

| | | | |
|---|---|---|---|
| 10,317,216 B1* | 6/2019 | Sipko | G01C 21/206 |
| 2002/0008621 A1* | 1/2002 | Barritz | G01S 5/00 |
| | | | 340/572.1 |
| 2004/0099736 A1* | 5/2004 | Neumark | G06K 17/0022 |
| | | | 235/385 |
| 2008/0027878 A1 | 1/2008 | Street | |
| 2010/0039228 A1* | 2/2010 | Sadr | G01S 5/12 |
| | | | 340/10.1 |
| 2010/0097208 A1* | 4/2010 | Rosing | G06Q 10/087 |
| | | | 340/539.13 |
| 2012/0249325 A1 | 10/2012 | Christopher | |
| 2013/0259308 A1* | 10/2013 | Klusza | G06K 9/00624 |
| | | | 382/103 |
| 2013/0267253 A1* | 10/2013 | Case | H04W 4/021 |
| | | | 455/456.3 |
| 2013/0297422 A1* | 11/2013 | Hunter | G06Q 30/0261 |
| | | | 705/14.58 |
| 2014/0006131 A1 | 1/2014 | Causey | |
| 2014/0045549 A1* | 2/2014 | Ryan | H04N 5/3532 |
| | | | 455/556.1 |
| 2014/0086590 A1* | 3/2014 | Ganick | G06Q 30/02 |
| | | | 398/118 |
| 2014/0087761 A1* | 3/2014 | Baskin | G06Q 30/0261 |
| | | | 455/456.3 |
| 2014/0274136 A1* | 9/2014 | Edge | H04W 4/04 |
| | | | 455/456.2 |
| 2014/0280316 A1* | 9/2014 | Ganick | G06F 17/30522 |
| | | | 707/769 |
| 2015/0161715 A1 | 6/2015 | Rose | |
| 2015/0193971 A1* | 7/2015 | Dryanovski | G06T 17/05 |
| | | | 345/419 |
| 2015/0204676 A1 | 7/2015 | Zhang | |
| 2015/0235474 A1 | 8/2015 | Mullins | |
| 2015/0247917 A1* | 9/2015 | Gum | H04W 4/029 |
| | | | 342/452 |
| 2015/0350841 A1* | 12/2015 | Dal Santo | H04W 4/029 |
| | | | 455/456.3 |
| 2015/0356610 A1* | 12/2015 | Ponoth | G06Q 10/087 |
| | | | 705/14.58 |
| 2016/0047890 A1* | 2/2016 | Ryan | G01S 5/16 |
| | | | 398/118 |
| 2017/0066464 A1* | 3/2017 | Carter | B60T 7/12 |
| 2017/0169444 A1* | 6/2017 | Housholder | G06Q 30/0201 |
| 2017/0176191 A1* | 6/2017 | Li | G01C 21/34 |
| 2017/0219359 A1* | 8/2017 | Elhoushi | G01C 21/206 |
| 2017/0337522 A1* | 11/2017 | Bennett | G06Q 10/1097 |
| 2017/0343353 A1* | 11/2017 | Mahmoud | G06Q 20/202 |
| 2017/0363423 A1* | 12/2017 | Dormody | G01S 19/14 |
| 2018/0181995 A1* | 6/2018 | Burry | G06Q 30/0269 |
| 2018/0278462 A1* | 9/2018 | Bjontegard | H04L 41/044 |
| 2018/0315162 A1* | 11/2018 | Sturm | G06T 15/10 |
| 2019/0011268 A1* | 1/2019 | Ashar | G01C 21/206 |
| 2019/0072638 A1* | 3/2019 | Wang | G01S 5/14 |

* cited by examiner

SYSTEMS, APPARATUSES, AND METHOD FOR MAPPING A SPACE

CROSS-REFERENCE TO RELATED APPLICATION

This application claims the benefit of the following U.S. Provisional Application No. 62/324,563 filed Apr. 19, 2016, which is incorporated herein by reference in its entirety.

TECHNICAL FIELD

This invention relates generally to portable devices.

BACKGROUND

A typical home includes a number of rooms and objects such as fixtures and furniture. The objects and rooms in the home may be used for different purposes by the residents.

BRIEF DESCRIPTION OF THE DRAWINGS

Disclosed herein are embodiments of systems, apparatuses and methods pertaining to mapping a space. This description includes drawings, wherein.

Figure 1:
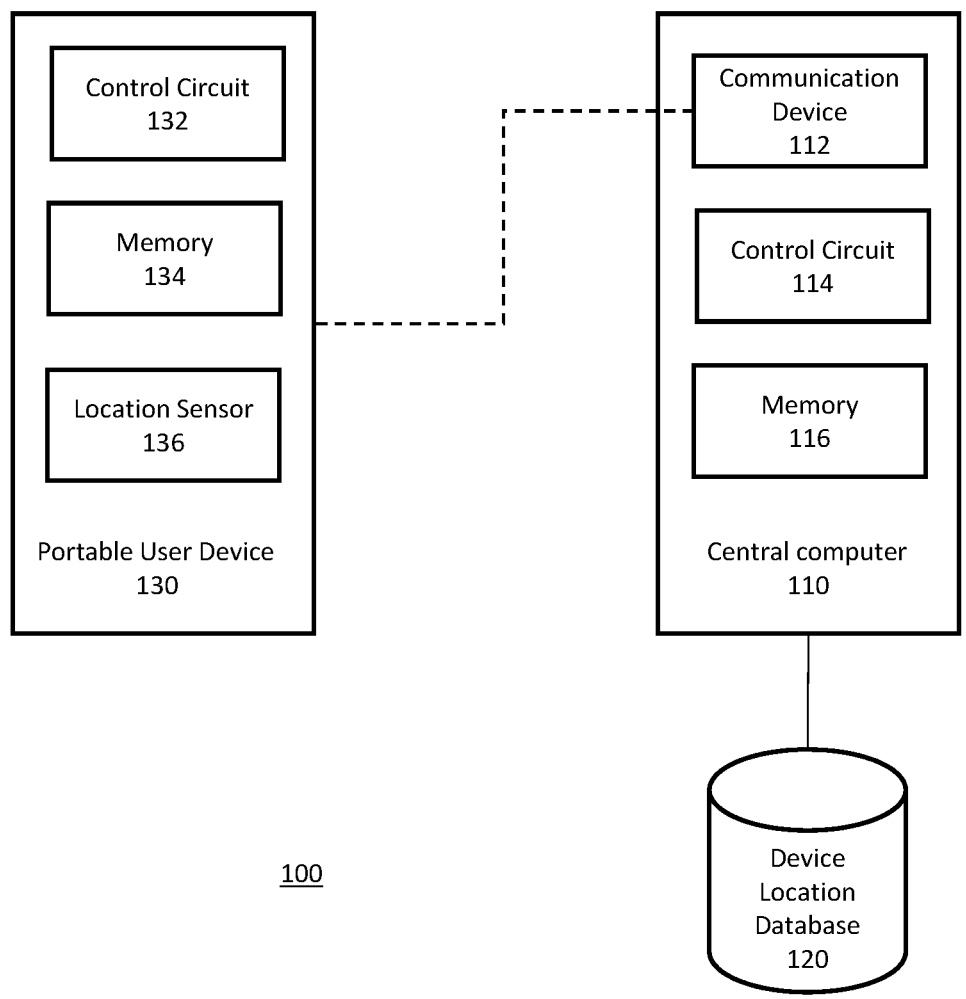
FIG. 1 is a block diagram of a system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to mapping a space. In some embodiments, a system for mapping a space comprises a communication device configured to receive location data from a portable user device in a user space, a device location database configured to store location data from the portable user device, and a control circuit coupled to the communication device and the device location database. The control circuit being configured to aggregate, over time, the location data in the user space from the portable user device and store the location data in the device location database, the location data comprising coordinates and timestamps associated with a plurality of locations, determine a plurality of dwell locations in the user space corresponding to locations where the portable user device rests based on the timestamps of the location data, and identify one or more objects in the user space based at least on the coordinates of the plurality of dwell locations.

In some embodiments, a home mapping service is provided. A customer may opt-in to the service and wear and/or carry a portable device (e.g. cell phone, wearable fitness tracking device, etc.) to collect location data. The system may track the device location through triangulation and/or through tracking the device's distance from one or more fixed points within the home. In some embodiments, the system may determine where the device dwells and map the areas in the user's home that corresponds to sitting locations, charging locations, eating locations, cooking locations, sleeping locations, and outside locations. In some embodiments, location data from a wearable device and activities associated with different areas of the home may be compared to provide the customer with information on which areas may need attention. For example, while the garage may have high traffic volume, the garage may not need as much attention as a kitchen or bathroom with similar traffic volume. In some embodiments, area usage may be determined based on combining video analysis and data collected with wearable devices. In some embodiments, the portable device may also be placed on the collar of an animal to enable more mapping of the user's home. In some embodiments, other sensors such as thermal detectors may be used to find heat and cold leaks within the home. In some embodiments, the system may use the portable device location data with other sensor data to recommend products which would make the home more ecologically and/or economically efficient. In some embodiments, to supplement the mapping, the customer may also take a video and/or have a 360 degrees three-dimensional (3D) scan of their home for further analysis. The system may analyze video and 3D scans for lighting and other data for ergonomically correctness. The system may then recommend products to assist the customer in improving their experience at home and/or at the office.

In some embodiments, the systems and methods described herein may be useful in mapping a home with wearable technology. In some embodiments, the system may use a reference point and dwell time to determine the locations of objects within the home. The collected data may be used to identify potential issues and recommend products and/or services for purchase. In some embodiments, the system may further use of 3D scanners, video cameras, and/or other sensors to supplement the data collected by the wearable devices. For example, the system may obtain an initial 3D scan of the home and use the wearable device to detect for areas which need attention based on traffic volumes in different areas.

Referring now to FIG. 1, a system for mapping a space is shown. The system 100 includes a central computer system 110 coupled to a device location database 120 and configured to communicate with a portable user device 130. The central computer system 110 may comprise one or more of a server, a central computing system, a retail computer system, a personal computer system and the like. Generally, the central computer system 110 may be any processor-based device configured to communicate with portable user devices 130 and aggregate device location information to map a space. The central computer system 110 comprises a control circuit 114, a memory 116, and a communication device 112.

The control circuit 114 may comprise a central processing unit, a processor, a microprocessor and the like and may be configured to execute computer readable instructions stored the memory 116. The memory 116 may comprise one or more of a volatile and non-volatile computer readable memory storage device. The control circuit 114 may generally be configured to communicate with the portable user device 130 via the communication device 112 to collect device location data and map a space using the device location data. The communication device 112 may comprise one or more of a wired and wireless communication device such as a network adapter, a data port, a Wi-Fi transceiver, a modem, etc. In some embodiments, the communication device 112 may be configured to communicate with the portable user device 130 via one or more of the Internet, a secured data connection, and a mobile data network. In some embodiments, the control circuit 114 may perform one or more steps in the methods and processes described with reference to FIGS. 2-5 herein.

The central computer system 110 may be coupled to the device location database 120 via a wired and/or wireless communication channel. The device location database 120 may generally be configured to store location data received from portable user devices 130. In some embodiments, the device location database 120 may be at least partially implemented with the memory 116 of the central computer system 110. The device location database 120 may store location data from one or more portable user devices 130. In some embodiments, location data received from the portable user device 130 may be associated with a user profile in the device location database 120 that has been previously associated with the portable user device 130. In some embodiments, the location data of the portable user device 130 may be based on device locations obtained based on one or more inertial measurements, Global Positioning System (GPS), Wi-Fi based positioning system, Near Filed Communication (NFC) positioning system, and Radio Frequency Identification (RFID) positioning system. In some embodiments, the location data may comprise one or more of two-dimensional (2D) coordinates, 3D coordinates, height information, timestamp, accelerometer measurement, and gyroscope measurement for one or more a plurality of locations. In some embodiments, the coordinate information in the location data may comprise a global coordinate such as a GPS coordinate. In some embodiments, the coordinate information in the location data may comprise a reference coordinate relative to a reference location in the user space. For example, the reference location may comprise an entrance of the user space, a wireless transmitter and/or receiver location, and/or a range sensor location. In some embodiments, user profiles stored in the device location database 120 may include other user information such as user demographic, purchase history, user preferences etc. The user profiles may be used supplement the location data in identifying objects and/or rooms in the user space and/or recommend products and/or services to the user.

The portable user device 130 may comprise a processor-based device configured to be carried by a user. In some embodiments, the portable user device 130 may comprise one or more of a mobile phone, a smart phone, a fitness tracking device, a wearable tracker, a wearable smart device, a head mounted device, etc. Generally, the portable user device 130 may be configured to provide data to the central computer system 110 such that the central computer system 110 may aggregate the locations of the portable user device 130 over time. The portable user device 130 may comprise a control circuit 132, a memory 134, and a location sensor 136. The control circuit 132 may comprise a central processing unit, a processor, a microprocessor and the like and may be. The control circuit 132 may be configured to execute computer readable instructions stored the memory 134. The memory 134 may comprise one or more of a volatile and non-volatile computer readable memory storage device. The control circuit 132 may generally be configured to communicate with central computer system 110 via a communication device (not shown) to provide device location data. The communication device may comprise one or more wireless communication devices such as a Wi-Fi transceiver, a cellular signal transceiver, a mobile data network transceiver, etc.

The location sensor 136 may comprise one or more sensors for determining the location of the portable user device 130. In some embodiments, the location sensor 136 may comprise one or more of a GPS sensor, a Wi-Fi transceiver, a mobile data transceiver, a Bluetooth transceiver, an accelerometer, an altimeter, and a gyroscope. In some embodiments, the location may be determined as a global coordinate such as a GPS coordinate. In some embodiments, the portable user device 130 may determine a reference coordinate relative to a reference location in the user space. In some embodiments, the reference location may comprise an entrance of the user space, a wireless transmitter and/or receiver location, and/or a range sensor location. For example, the location may be tracked using inertial measurements and dead reckoning from the point of entrance of the user space. In another example, the location of the portable user device 130 may be estimated based on signal strength triangulation with one or more wireless transceiver such as a wireless router, a Bluetooth transceiver, etc. In some embodiments, location data comprises a 3D location data with estimated coordinates in x, y, and z axes. In some embodiments, the location data comprises 2D coordinates and a change in device height detected by one or more of an accelerometer, an altimeter, and a gyroscope of the portable user device 130. In some embodiments, the portable user device 130 may have installed on it, a location determination application and/or module for determining the location of the portable user device 130 based on the measurements of the location sensor 136. In some embodiments, the portable user device 130 may be configured to provide raw location sensor measurements to the central computer system 110 as location data and the location of the portable user device may be determined/estimated by the central computer system 110.

In some embodiments, the portable user device 130 may further comprise a user interface device for interacting with a user interface provided by the central computer system 110. In some embodiments, the user interface device may comprise one or more user input/output devices such as a display screen, a touch screen, one or more buttons, a microphone, a speaker, etc. In some embodiments, the user interface displayed on the portable user device 130 may allow the user to register the portable user device 130 with the user space mapping service and/or modify user profile and preferences associated with the service. In some embodiments, the central computer system 110 may cause the user interface to display a representation of the mapped space to the user and allow the user to modify and correct assumptions made by the system. For example, the user may change a room or an object designation generated by the system in the user interface. In some embodiments, the user interface may be configured to allow the user to manually provide data for mapping the space. For example, the user may associate a room, an object, and an activity, etc. with the device's current location.

While only one portable user device 130 is shown in the system 100 of FIG. 1, in some embodiments, the system may map a space based on data received from two or more portable user devices 130 associated with one or more users sharing the physical space. For example, location data may be collected from two or more devices belonging to the same person and/or multiple members of a household to map a space. In some embodiments, the central computer system 110 may be configured to simultaneously map a plurality of separate user spaces using data from multiple portable user devices.

Figure 2:
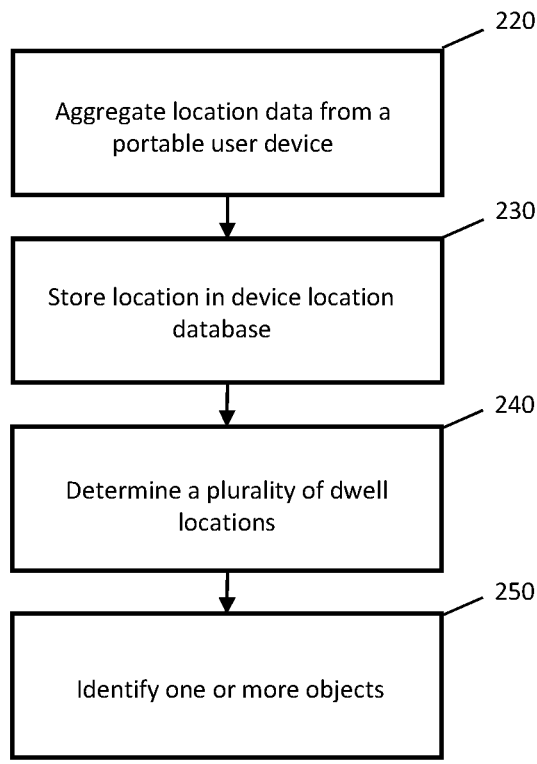
FIG. 2 is a flow diagram of a method in accordance with some embodiments.

Referring now to FIG. 2, a method for mapping a space is shown. In some embodiments, the steps shown in FIG. 2 may be performed by a processor-based device, such as the central computer system 110 and/or the portable user device 130 shown in FIG. 1.

In step 220, the system aggregates location data from a portable user device. In some embodiments, the location data of the portable device may be based on locations measured based on one or more of inertial measurements, Global Positioning System (GPS), Wi-Fi based positioning system, Near Filed Communication (NFC) positioning system, and Radio Frequency Identification (RFID) positioning system. In some embodiments, the user device may include a location sensor comprising one or more of a GPS sensor, a Wi-Fi transceiver, a mobile data transceiver, a Bluetooth transceiver, an accelerometer, an altimeter, and a gyroscope. In some embodiments, the device location may be determined as a global coordinate such as a GPS coordinate. In some embodiments, the location may comprise a reference coordinate relative to a reference location in the user space. For example, the reference location may comprise an entrance of the user space, a wireless transmitter and/or receiver location, and/or a range sensor location. In some embodiments, the device location may then be tracked using inertial measurements and dead reckoning from the point of entrance of the user space using accelerometer and/or gyroscope measurements. In some embodiments, the location of the portable user device 130 may measure by signal strength triangulation with one or more wireless transceiver such as wireless routers, Bluetooth transceivers, etc. In some embodiments, the device's location data may comprise 3D location data with coordinates in x, y, and z axes. For example, the height information of a location may be measured by a location sensor on the portable device similar to the x and y coordinate and recorded as a z-axis height coordinate. In some embodiments, the location data comprises x and y coordinates in the plane generally parallel to the ground and a change in device height detected by one or more of an accelerometer, an altimeter, and a gyroscope of the portable user device. In some embodiments, the height information may comprise an amount of height change preceding and/or following a period of rest at a location. For example, the system may assume that the portable device is carried at a set height range when a user is walking around in the user space. The amount of height drop detected by a gyroscope of the portable device preceding and/or following a period of rest may then be used to estimate the height of the resting location (e.g. seat, counter, table, etc.). The location data may comprise a plurality of locations and/or paths aggregated over time. For example, the system may aggregate location data over days, months, or years. In some embodiments, the system may be configured to collect data only when the portable user device is estimated to be within a space to be mapped. For example, a customer may enroll the address of their residence or office with the mapping space. The system may then only aggregate portable user device locations that are estimated to be within the customer's space.

In step 230, the system stores the device locations in a device location database. The stored location data may comprise one or more of 2D coordinates, 3D coordinates, height information, height change information, timestamp, accelerometer measurement, and gyroscope measurement of a plurality of locations. In some embodiments, the location data from a mapped space may be aggregated from two more user devices associated with one or more users. In some embodiments, the location data may be associated with a user profile and/or a user location in the device location database. The device location database 120 may be configured to aggregate location data associated with a space over days, months, and/or years.

In step 240, the system determines a plurality of dwell locations based on the stored location data. Dwell locations may generally correspond to locations in the user space where the portable user device rests based on the timestamps of the location data. In some embodiments, the dwell locations may correspond to locations where a device is set down. For example, a dwell location may correspond to a counter or a table where a portable user device is placed for a period of time. In some embodiments, the dwell locations may correspond to locations where a user carrying the device dwells. For example, a dwell location may correspond to a chair in which a user sits for a period of time.

In some embodiments, the system may have one or more predetermined duration and/or location proximity thresholds for determining whether a dwell instance has occurred. For example, in some embodiments, a location may be determined to be a dwell location if a device remains at rest for a set period of time (e.g. 10 seconds, 1 minute, etc.) according to the timestamps associated with a plurality of location data points. In some embodiments, the system may group a range of locations (e.g. 1 feet radius, 3 feet radius, etc.) in proximity of each other as a dwell location. For example, location changes due to a user's minor movements (e.g. handling a device, shifting position) while standing and/or sitting in one spot may be grouped for the purpose of determining whether the dwell time at the location exceeds the dwell instance threshold. Generally, the system may use the location data coordinates and timestamps aggregated in steps 220 and 230 to track the movement of a user and determine locations and/or areas that a user and/or the portable user device dwells for a set period of time. In some embodiments, the system may mark one or more location data points as being associated with dwell instances in the device location database 120. In some embodiments, the system may generate a dwell location list based on the received location data. In some embodiments, each dwell location may correspond to a range of coordinates and one or more timestamps and/or durations of dwell instances at the location.

In step 250, the system identifies one or more objects in the user space based at least on the coordinates of the plurality of dwell locations. In some embodiments, objects may be identified by comparing heights of one or more dwell locations in an area of the user space with one or more expected heights of known objects. For example, standard kitchen counters are around 36 inches tall. If a cluster of dwell locations having estimated heights of around 36 inches is located in an area of a user space, the system may determine that a kitchen counter is present in that area. In some embodiments, objects may be identified based on relative positions of dwell locations that are in proximity to each other. In some embodiments, the dwell locations in a proximate area may be aggregated by the system to form an outline of the shape of an object and the system may use the outline to identify the object. For example, if a group of dwell locations are near each other in two height ranges, the system may determine that the two height ranges correspond to arm and seat heights of an armchair and identify the presence of an armchair in that area. In some embodiments, objects may be identified based on timestamps associated with dwell locations. For example, if a cluster of dwell locations have the timestamps that fall mainly between 6 pm and 7 pm, the system may determine that the area corresponds to a dining table set. In some embodiments, the system may further distinguish between dwell locations associated with dining chairs and the dining table based on dwell location height information. In another example, if a cluster of dwell locations have timestamps that fall mainly between midnight to 7 am, the system may determine that the area corresponds to a night stand. In some embodiments, one or more objects may be identified based on other identified objects in the same space. For example, if a cluster of dwell locations has been identified to be a couch, a second cluster of dwell locations at table height near the couch may be identified as a coffee table or a side table. In some embodiments, the system may comprise an object database comprising object profiles such as dimensions, height, outline, typical use time, etc. The system may compare the aggregated dwell locations with object profiles in the object database to identify one or more objects in the mapped space. In some embodiments, the identification of the objects may be supplemented by other sensor data such as camera images and/or 3D scanner data captured in the user space.

In some embodiments, the system may further identify one or more pathways in the user space based on the location data. For example, a user's path between dwell locations may generally correspond to walkable pathways in the user space. In another example, the system may track the user's movement speed and assume that areas with movement speeds exceeding a set threshold correspond to pathway areas. In some embodiments, the system may further determine a layout of the user space based on the pathway data and/or dwell location data. The layout may comprise the locations of rooms and/or barriers. For example, the system may assume that areas of the user space that contains no history of recorded device locations correspond to walls and/or barriers. In some embodiments, the system may further determine one or more of a room type, room usage, and user activity for each of the two or more rooms based on one or more of the location data, the one or more objects, and one or more timestamps associated with locations within each of the two or more rooms. For example, if a dining table is identified, the system may assume that the room containing the table is a dining room. In another example, a room surrounded on one or more sides by a kitchen counter may be assumed to be the kitchen. In yet another example, if dwell locations having timestamps between midnight and 7 am are clustered in one room, the system may identify the room as a bedroom. In some embodiments, the identified room type and/or usage information may be used to identify other objects in the space. For example, if a room has been identified as a dining room, a table height dwell location may be assumed to correspond to a dining table.

In some embodiments, the system may further generate a product and/or service recommendation based on the one or more objects in the user space. For example, the system may identify a bed and determine its dimensions based on the dwell location data. The system may then recommend appropriate bedding based on the information. In some embodiments, the product and/or service recommendation is generated further based on a total dwell time associated with each of the one or more objects in the user space. For example, if a room is identified as the laundry room, the system may estimate the household's detergent consumption rate based on how often the laundry room is visited and recommend replenishment orders accordingly. In another example, if an object is identified as a dining table, the system may then track the number and/or types of meals that have been eaten at the dining table based tracking the number of dwell instances and/or the length of dwell durations near the dining table. The system may then recommend meals and/or portion sizes based on the information.

In some embodiments, steps 220 to 250 may be repeated as more location data is collected and aggregated. The system may identify additional objects and/or correct previous assumptions with the collection of additional location data. In some embodiments, the identification in step 250 and/or a determined layout of the user space may be made accessible to the user for correction and/or input. For example, the user may be able to select an object and/or a room in a user interface and identify the object or room to the system. In some embodiments, steps 220 and 230 may be performed continuously when the portable user device is in the user space and steps 240 and 250 may be performed periodically (e.g. once a day, one a week, etc.) based on aggregated location data.

Figure 3A:
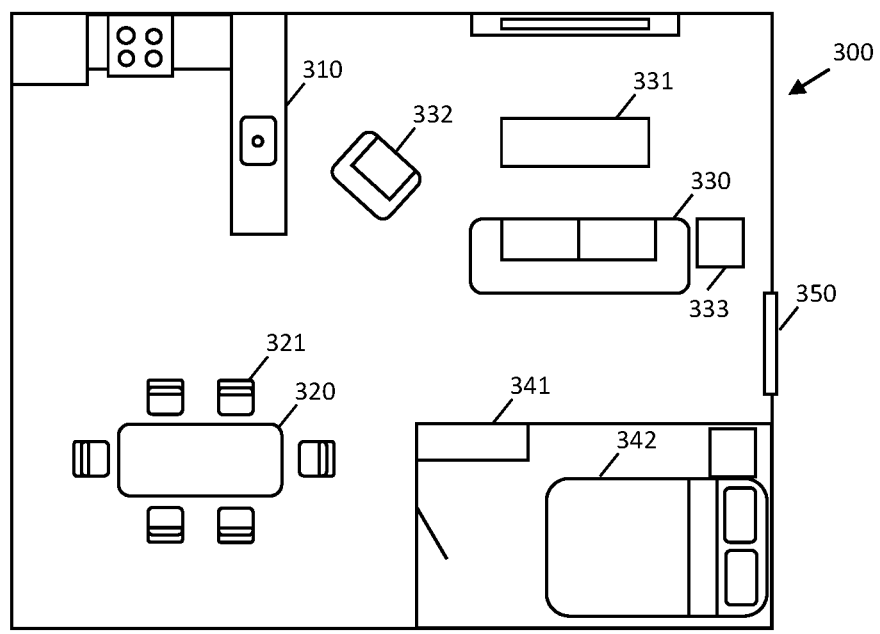
FIGS. 3A, 3B, 3C, and 3D are illustrations of space mapping in accordance with some embodiments.
Figure 3B:
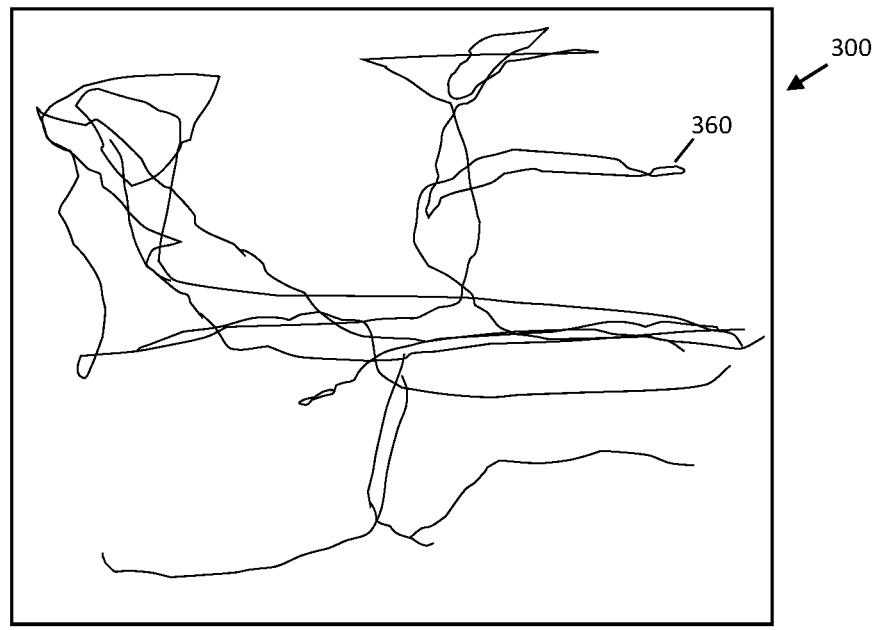

Referring now to FIGS. 3A-D, illustrations of space mapping is shown. FIG. 3A represents a top view of a user space 300. The user space 300 may comprise various furniture and fixtures such as a counter 310, a dining table 320, a dining chair 321, a sofa 330, a coffee table 331, an arm chair 332, a side table 333, a dresser 341, a bed 342, and an entry door 350. FIG. 3B represents paths 360 that may be formed by locations tracked by the system. Based on the paths 360, the system may determine one or more of the boundary, pathways, and barrier locations in the user space 300. For example, in FIG. 3B, the system may determine that a pathway is present near the middle of the user space 300 based on the traffic pattern. In some embodiments, the system may further determine the location of the entry door 350 based on tracking the beginnings of the paths 360 in the user space 300. The paths 360 shown in FIG. 3B are for illustration only, the tracked paths may comprise over dozens, hundreds of paths aggregated over time. In some embodiments, the aggregated paths 360 may form an image of accessible spaces in the user space 300 overtime.

Figure 3C:
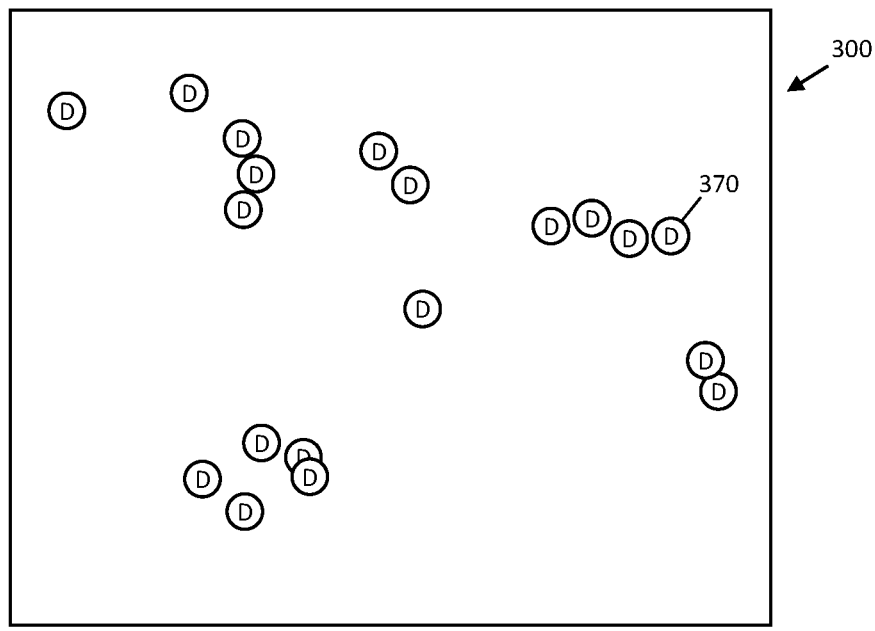

FIG. 3C illustrates system detected dwell locations 370 within the user space 300. Each dwell location 370 may generally correspond locations in the user space where the portable user device rests. In some embodiments, the system may have one or more predetermined duration and/or location proximity thresholds for determining dwell locations. For example, in some embodiments, a location may be determined to be a dwell location if a device remains at rest for a set period of time (e.g. 10 seconds, 1 minute, etc.) within an area. In some embodiments, a dwell location 370 may correspond to a collection of coordinates (e.g. 1 feet radius, 3 feet radius, etc.) in proximity of each other. In some embodiments, location changes due to a user's minor movements (e.g. handling a device, shifting position) while standing and/or sitting in one spot may be grouped for the purpose determining whether a dwell time exceeds the dwell instance threshold. In some embodiments, the system may use the map of the dwell locations as shown in FIG. 3C to detect for and/or identify one or more objects in the user space 300. For example, the system may detect for the clustering of dwell locations over time to detect for the present of an object that the device and/or a person may rest on. For example, each cluster of dwell locations 370 may correspond to a table, a counter, a chair, etc. In some embodiments, the system may further use timestamps associated with dwell locations to identify objects and/or usages associated with areas of the user space 300. For example, if a device repeatedly dwells in an area between midnight and 7 am, the system may determine the object to be a nightstand.

Figure 3D:
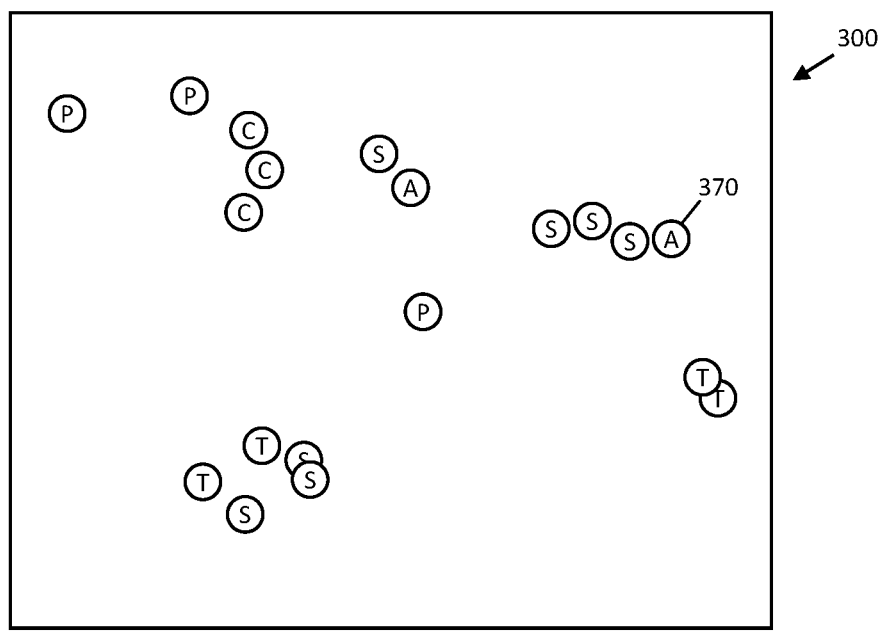

FIG. 3D illustrates dwell locations with height information within the user space 300. In FIG. 3D, letters C, P, A, S, and T, represents dwell locations having height ranges associated with counter height, pocket height, arm height, seat height, and table heights respectively. In some embodiments, the system may identify objects based on height information associated with the dwell locations. For example, the system may determine that an area having a cluster of counter height dwell locations corresponds to the location of a kitchen counter 310 in the user space 300. In another example, the system may determine that a cluster of table height dwell locations surrounding by seat height dwell locations correspond to a dining table 320. In some embodiments, the system may use the relative heights of dwell locations in a cluster to determine the shape of the object and identify the object based on the shape outline. In some embodiments, the height information may be measured by a location sensor on the portable device and recorded as a z-axis height coordinate in the device location database. In some embodiments, the height information may comprise an amount of height change preceding and/or following a period of rest at a location. For example, the system may assume that the portable device is carried at a set height range when a user is walking around the user space 300. The amount of height drop detected by accelerometer and/or altimeter of the portable device preceding and/or following a dwell instance may then be used to estimate the height of the resting location (e.g. seat, counter, table, etc.). For example, the system may determine the location of the sofa 330 based on detecting multiple sudden height drops in the area associated with the sofa 330. The dwell locations 370 shown in FIGS. 3C and 3D are for illustration only, the system may record any number of dwell locations over time for analysis and object identification.

Figure 4:
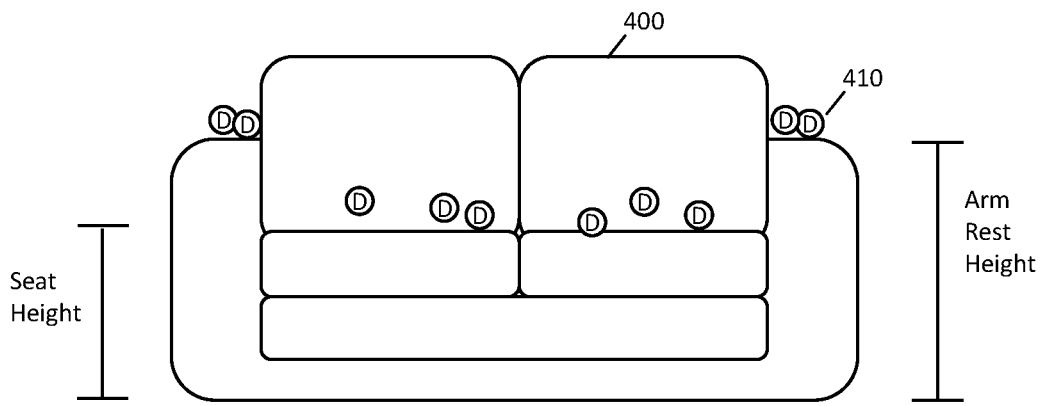
FIG. 4 is an illustration object identification in accordance with some embodiments.

Referring now to FIG. 4, an illustration of object identification is shown. In FIG. 4, the system may track a plurality of dwell locations 410 in a space corresponding to a sofa 400. A first group of dwell locations may have heights associated with typical heights of arm rests and a second group of dwell locations may have heights associated with typical heights of seats. The system may group the dwell locations 410 shown in FIG. 4 as being associated with an object due to their proximity to each other, and use the relative locations of the dwell locations 410 to identify the object. In this case, the system may determine the object to be a sofa 400 based on the relative locations of seat height dwell locations and armrest height dwell locations. In some embodiments, the system may further estimate a dimension of the object (e.g. sofa width, seat height, etc.) based on the dwell locations 410. For example, the system may determine that the sofa 400 is a two-seater based on the width between the groups of arm height dwell locations. While FIG. 4 comprises a 2D illustration, in some embodiments, object identifying may be based on 3D locations of the dwell locations 410. For example, the dwell locations may form a 3D outline of the shape of the object and the system may compare the outline to 3D profiles of known objects to identify the object.

Figure 5:
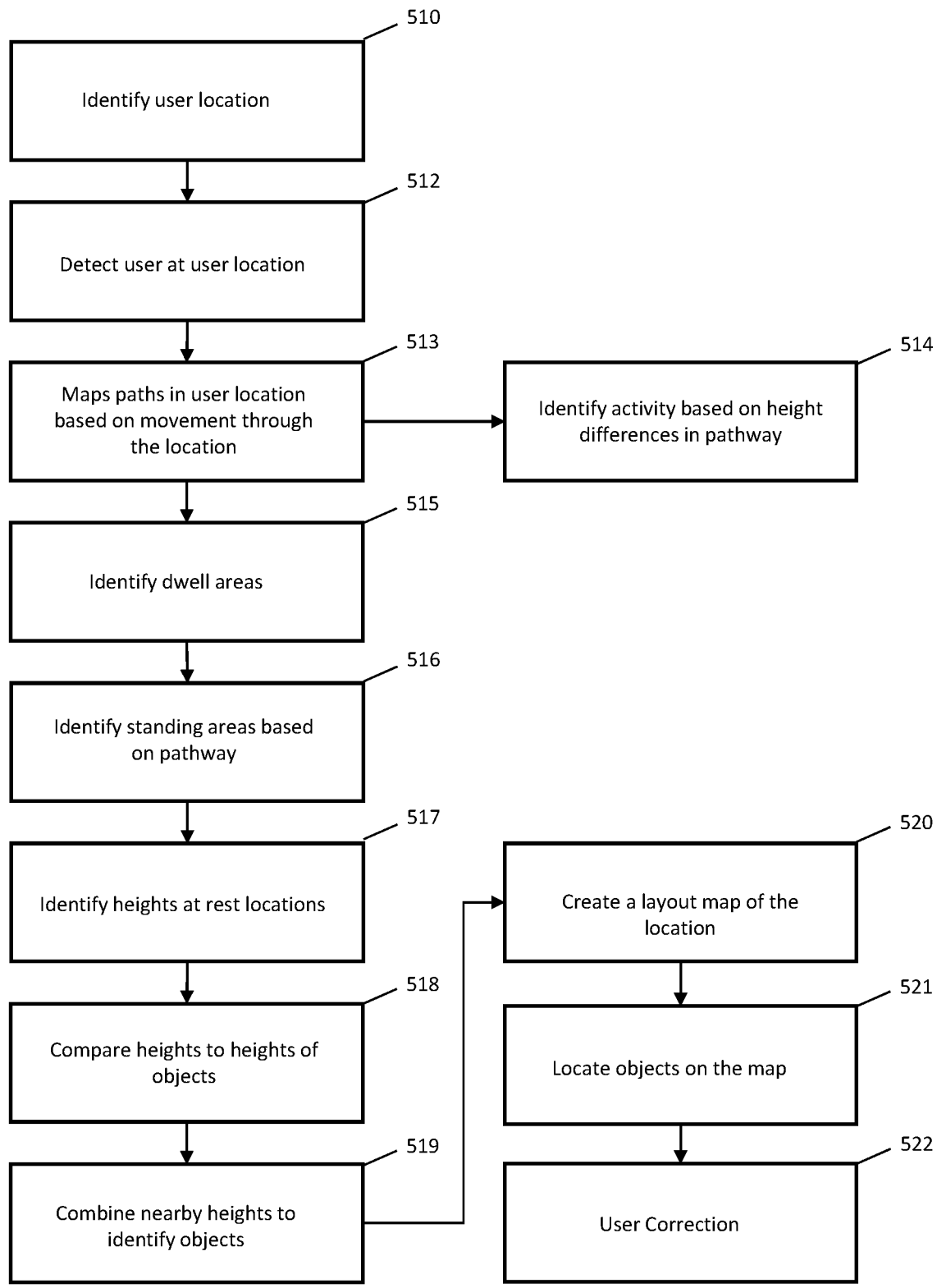
FIG. 5 is a flow diagram of a process in accordance with some embodiments.

Referring now to FIG. 5, a method for mapping a space is shown. In some embodiments, the steps shown in FIG. 5 may be performed and/or tracked by a processor-based device, such as the central computer system 110 and/or the portable user device 130 shown in FIG. 1.

In step 510, the system identifies a user location for mapping. In some embodiments, the user may enter a street address in step 510 to enroll in the space mapping service. In some embodiments, the system may track the device location over time and determine a user space associated with the user (e.g. residence, office space, etc.) based the user's travel pattern. For example, the system may assume that the location most frequented by a user after 9 pm is the user's residence. In step 512, the system detects that the user is at the user location. In some embodiments, the system may be configured to only aggregating location data to map a space when the user is within the space to be mapped. In some embodiments, step 512 may be based on comparing the GPS location of a portable user device with the GPS coordinates associated with the user space identified in step 510. In some embodiments, step 512 may be based on the portable user device being within the range of a wireless transceiver (e.g. Wi-Fi router, Bluetooth transceiver, etc.) in the user space. In some embodiments, step 512 may be optional.

In step 513 the system maps the paths in the user location based on the portable device's movement through the user location. In some embodiments, the system may determine the device's movement speed based on the timestamps associated with the locations and/or via a movement sensor on the portable device such as a gyroscope. In some embodiments, if the device's movement speed exceeds a threshold, the area of movement may be assumed to be pathways in the user space. In some embodiments, in step 514, the system may further determine the user's activity in the pathway based on height differences and/or changes in areas associated with the pathway. For example, if a set of paths indicates that a user repeatedly moves back and forth in an area and bends down, the system may determine that the user is vacuuming the area.

In step 515, the system determines dwell areas. Dwell areas may correspond to areas where the tracked portable device is at rest. In some embodiments, a dwell area may correspond to a small range of locations in which the device stays for a set period of time. For example, a dwell location may correspond to a location where the device is set down on a surface or a location where a person carrying the device stands or sits still. In step 516, the system may compare the pathways determined in step 513 and the dwell locations identified in step 515 to determine which dwell locations falls in the pathway. These dwell locations may then be determined to be standing locations and not rest locations.

In step 517, the system identifies height information of locations data points at rest locations. In some embodiments, heights of the devices at the rest locations may be provided by one or more locations sensors on the user device. In some embodiments, the height information may be measured as a z-axis coordinate by a location sensor. In some embodiments, the height information may comprise a height change information indicating the change in height just prior to the device begins to dwell at the rest location. In step 518, the system compares heights of dwell locations to typical heights of objects. For example, dwell locations may be grouped into one or more height ranges such as floor height, coffee table height, seat height, pocket height, table height, counter height, etc. to identify objects. In step 519, the system combines the heights of nearby dwell locations and identifies one or more objects in the user space. In some embodiments, the system may use the relative positions of dwell location in an area to determine an outline of the object. For example, if two sets of arm rest heights dwell locations are adjacent to a cluster of seat height locations, depending on the width between the armrest height dwell locations, the system may determine the object to be an armchair, a sofa, or the like.

In step 520, the system creates a layout map of the user location selected in step 510. The layout map may be generated based on marking areas associated with pathways, objects, and/or barriers. In step 521, the system locates the objects identified in step 519 on the map. Step 521 may generally be based on the coordinates of the dwell locations associated with each identified object. In step 522, the system provides a representation of the layout and/or identified objects in the user space to a user for review. In some embodiments, a user may provide feedback/correction on recommendations via the user interface. In some embodiments, steps 512 through 522 may be repeated to identify additional objects at the user locations and/or to correct previous assumptions made by the system.

In some embodiments, a system for mapping a space comprises a communication device configured to receive location data from a portable user device in a user space, a device location database configured to store location data from the portable user device, and a control circuit coupled to the communication device and the device location database. The control circuit being configured to aggregate, over time, the location data in the user space from the portable user device and store the location data in the device location database, the location data comprising coordinates and timestamps associated with a plurality of locations, determine a plurality of dwell locations in the user space corresponding to locations where the portable user device rests based on the timestamps of the location data, and identify one or more objects in the user space based at least on the coordinates of the plurality of dwell locations.

In some embodiments, a method for mapping a space comprises aggregating, via a communication device and over time, location data from a portable user device in a user space, storing the location data in a device location database, the location data comprising coordinates and timestamps associated with a plurality of locations, determining, by a control circuit, a plurality of dwell locations in the user space corresponding to locations where the portable user device rests based on timestamps of the location data, and identifying, by the control circuit, one or more objects in the user space based at least on the coordinates of the plurality of dwell locations.

In some embodiments, an apparatus for mapping a space comprises a non-transitory storage medium storing a set of computer readable instructions and a control circuit configured to execute the set of computer readable instructions which causes to the control circuit to: aggregate, via a communication device and over time, location data from a portable user device in a user space, store the location data in a device location database, the location data comprising coordinates and timestamps associated with a plurality of locations, determine a plurality of dwell locations in the user space corresponding to locations where the portable user device rests based on timestamps of the location data, and identify, by the control circuit, one or more objects in the user space based at least on the coordinates of the plurality of dwell locations.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for mapping a space comprising:
   a communication device configured to receive location data from a portable user device in a user space;
   a device location database configured to store the location data from the portable user device;
   an object database configured to store object dimensions associated with a plurality of objects; and
   a control circuit coupled to the communication device, the object database, and the device location database, the control circuit being configured to:
   aggregate, over time, the location data in the user space from the portable user device and store the location data in the device location database, the location data comprising 2D coordinates, height information, and timestamps associated with a plurality of locations, wherein the height information is determined based on a movement sensor of the portable user device;
   determine a plurality of dwell locations in the user space corresponding to locations where the portable user device rests based on the timestamps of the location data;
   compare a cluster of dwell locations with object dimensions associated with the plurality of objects in the object database to identify one or more furniture items in the user space based at least on comparing the 2D coordinates and the height information of the cluster of dwell locations with shapes of the one or more furniture items stored in the object database; and
   identify a room type associated with an area within the user space based on at least one furniture item identified in the area.

2. The system of claim 1, wherein the location data of the portable user device comprises locations measured based on one or more inertial measurements, Global Positioning System (GPS), Wi-Fi based positioning system, Near Field Communication (NFC) positioning system, and Radio Frequency Identification (RFID) positioning system.

3. The system of claim 1, wherein the height information comprises a change in height of the portable user device is detected by one or more of an accelerometer, an altimeter, and a gyroscope of the portable user device.

4. The system of claim 1, wherein the control circuit is further configured to:
   identify one or more pathways in the user space based on the location data.

5. The system of claim 1, wherein the control circuit is further configured to:
   determine, based on the location data, a layout of the user space comprising two or more rooms.

6. The system of claim 5, wherein the control circuit is further configured to:
   determine one or more of a room usage and user activity for each of the two or more rooms based on one or more of the location data, the one or more furniture items, and one or more timestamps associated with locations within each of the two or more rooms.

7. The system of claim 1, wherein the control circuit is further configured to:
generate a product and/or service recommendation based on the one or more furniture items in the user space.

8. The system of claim 7, wherein the product and/or service recommendation is generated further based on a total dwell time associated with each of the one or more furniture items in the user space.

9. A method for mapping a space comprising:
aggregating, via a communication device and over time, location data from a portable user device in a user space;
storing the location data in a device location database, the location data comprising 2D coordinates, height information, and timestamps associated with a plurality of locations, wherein the height information is determined based on a movement sensor of the portable user device;
determining, by a control circuit, a plurality of dwell locations in the user space corresponding to locations where the portable user device rests based on the timestamps of the location data; and
comparing, by the control circuit, a cluster of dwell locations with object dimensions associated with the plurality of objects in a object database to identify one or more furniture items in the user space based at least on comparing the 2D coordinates and the height information of the cluster of dwell locations with shapes of the one or more furniture items stored in the object database, wherein the object database is configured to store object dimensions associated with a plurality of objects; and
identifying a room type associated with an area within the user space based on at least one furniture item identified in the area.

10. The method of claim 9, wherein the location data of the portable user device comprises locations measured based on one or more inertial measurements, Global Positioning System (GPS), Wi-Fi based positioning system, Near Field Communication (NFC) positioning system, and Radio Frequency Identification (RFID) positioning system.

11. The method of claim 9, wherein the height information comprises a change in height of the portable user device is detected by one or more of an accelerometer, an altimeter, and a gyroscope of the portable user device.

12. The method of claim 9, further comprising:
identifying one or more pathways in the user space based on the location data.

13. The method of claim 9, further comprising:
determining, based on the location data, a layout of the user space comprising two or more rooms and locations of the one or more objects in the two or more rooms.

14. The method of claim 13, further comprising:
determining one or more of a room usage and user activity for each of the two or more rooms based on one or more of the location data, the one or more furniture items, and one or more timestamps associated with locations within each of the two or more rooms.

15. The method of claim 9, further comprising: generating a product and/or service recommendation based on the one or more furniture items in the user space.

16. The method of claim 15, wherein the product and/or service recommendation is generated further based on a total dwell time associated with each of the one or more furniture items in the user space.

17. An apparatus for mapping a space comprising:
a non-transitory storage medium storing a set of computer readable instructions; and
a control circuit configured to execute the set of computer readable instructions which causes to the control circuit to:
aggregate, via a communication device and over time, location data from a portable user device in a user space;
store the location data in a device location database, the location data comprising 2D coordinates, height information, and timestamps associated with a plurality of locations, wherein the height information is determined based on a movement sensor of the portable user device;
determine a plurality of dwell locations in the user space corresponding to locations where the portable user device rests based on the timestamps of the location data; and
compare, by the control circuit, a cluster of dwell locations with object dimensions associated with the plurality of objects in an object database to identify one or more furniture items in the user space based at least on comparing the 2D coordinates and the height information of the cluster of dwell locations with shapes of the one or more furniture items stored in the object database, wherein the object database is configured to store object dimensions associated with a plurality of objects; and
identifying a room type associated with an area within the user space based on at least one furniture item identified in the area.

* * * * *